United States Patent
Kramadhari et al.

(10) Patent No.: US 12,014,554 B2
(45) Date of Patent: Jun. 18, 2024

(54) METHOD AND SYSTEM FOR ESTIMATING ROAD LANE GEOMETRY

(71) Applicant: Continental Automotive GmbH, Hannover (DE)

(72) Inventors: Prashant Kramadhari, Ottobrunn (DE); Peter Barth, Wolnzach (DE)

(73) Assignee: Continental Automotive GmbH, Hannover (DE)

( * ) Notice: Subject to any disclaimer, the term of this patent is extended or adjusted under 35 U.S.C. 154(b) by 69 days.

(21) Appl. No.: 17/807,715

(22) Filed: Jun. 18, 2022

(65) Prior Publication Data

US 2022/0406077 A1 Dec. 22, 2022

(30) Foreign Application Priority Data

Jun. 18, 2021 (EP) ..................................... 21180195

(51) Int. Cl.
  *G06V 20/56* (2022.01)
  *B60W 40/06* (2012.01)
  *G06T 7/60* (2017.01)

(52) U.S. Cl.
  CPC ........... *G06V 20/588* (2022.01); *B60W 40/06* (2013.01); *G06T 7/60* (2013.01); *G06T 2207/30256* (2013.01)

(58) Field of Classification Search
  CPC ........ G06V 20/588; B60W 40/06; G06T 7/60; G06T 2207/30256
  See application file for complete search history.

(56) References Cited

U.S. PATENT DOCUMENTS

| 6,751,547 | B2 | 6/2004 | Khosla | |
| 11,685,405 | B2* | 6/2023 | Hashimoto | G06V 10/25 |
| | | | | 701/301 |
| 2011/0190972 | A1* | 8/2011 | Timmons | G08G 1/167 |
| | | | | 701/31.4 |
| 2014/0032108 | A1 | 1/2014 | Zeng et al. | |
| 2016/0288790 | A1 | 10/2016 | Aoki | |
| 2018/0173970 | A1* | 6/2018 | Bayer | G06F 18/253 |
| 2019/0103026 | A1* | 4/2019 | Liu | G06V 10/25 |
| 2019/0325595 | A1* | 10/2019 | Stein | G06V 10/82 |
| 2020/0049513 | A1* | 2/2020 | Ma | G05D 1/0088 |
| 2020/0094837 | A1 | 3/2020 | Kato | |
| 2020/0098135 | A1* | 3/2020 | Ganjineh | G06F 16/587 |
| 2020/0126408 | A1* | 4/2020 | Gigengack | B60W 30/12 |

(Continued)

FOREIGN PATENT DOCUMENTS

KR 101249366 B1 4/2013

OTHER PUBLICATIONS

Adnres Hernandez-Gutierrez, "Probabilistic Road Geometry Estimation using a Millimetre-Wave Radar", http://pnavhe11.irccyn.ec-nantes.fr/material/session3/Hernandez/Hernandez_paper.pdf.

(Continued)

*Primary Examiner* — Michael Lee

(57) ABSTRACT

A method and system for estimating road lane geometry includes a camera-estimated lane segment, for estimating lane geometry based on camera detection of road markings and a leading-vehicle-estimated lane segment, for estimating lane geometry based on traces of at least one leading vehicle. Estimated road geometry is obtained from a combination of the camera-estimated lane segment and the leading-vehicle-estimated lane segment.

11 Claims, 10 Drawing Sheets

(56) References Cited

U.S. PATENT DOCUMENTS

| | | | |
|---|---|---|---|
| 2021/0342600 A1* | 11/2021 | Westmacott | G06F 18/2148 |
| 2022/0042813 A1* | 2/2022 | Ko | G01C 21/3632 |
| 2022/0277163 A1* | 9/2022 | Stenneth | G06T 7/12 |

OTHER PUBLICATIONS

Jianqiang Ren, "Lane Detection in Video-Based Intelligent Transportation Monitoring via Fast Extracting and Clustering of Vehicle Motion Trajectories", vol. 2014, Article 1D 156296, 12 pages, http://dx.doi.org/10.1155/2014/156296.

Alexey Abramov, "Multi-Lane Perception Using Feature Fusion Based on GraphSLAM", Conference: 2016 IEEE/RSJ International Conference on Intelligent Robots and Systems (IROS), Oct. 2016, DOI:10.1109/IROS.2016.7759481.

Amy Gupta, A Framework for Lane Prediction Based on Vehicle Detection and Tracking, Springer Nature Singapore Pte Ltd. 2020, R. V. Babu et al. (Eds.): NCVPRIPG 2019, CCIS 1249, pp. 578-588, 2020. https://doi.org/10.1007/978-981-15-8697-2_54.

Christian Adam, "Probabilistic road estimation and lane association using radar detections", 14th International Conference on Information Fusion, Jul. 5-8, 2011, https://ieeexplore.ieee.org/abstract/document/5977457/.

Chunzhao Guo, "Improved Lane Detection based on Past Vehicle Trajectories", 2014 IEEE 17th International Conference on Intelligent Transportation Systems (ITSC), Oct. 8-11, 2014, Qingdao, China.

European Search Report dated Dec. 2, 2021 for the counterpart European Patent Application No. 21180195.6.

Examination Report dated Mar. 1, 2024 from corresponding European patent application No. 21180195.6.

* cited by examiner

METHOD AND SYSTEM FOR ESTIMATING ROAD LANE GEOMETRY

CROSS-REFERENCE TO RELATED APPLICATIONS

The present application claims priority under 35 U.S.C. § 119 to European Patent Application No. 21180195.6, filed on Jun. 18, 2021, in the European Patent Office, the disclosure of which is herein incorporated by reference in its entirety.

BACKGROUND

1. Field

Embodiments of the present application relate to a method for estimating road lane geometry, to a system for estimating road lane geometry, and to a vehicle comprising a system for estimating road lane geometry.

2. Description of Related Art

For semi-autonomous driving and autonomous driving of vehicles on a road, the knowledge of the geometry of the road lanes ahead is an important aspect. As an example, the speed of an ego vehicle has to be reduced if a sharp corner is ahead. As another example, the speed of an ego vehicle has to be reduced if there is a slower vehicle ahead on the same lane as the ego vehicle, however the speed of the ego vehicle may be maintained if the slower vehicle is on a different lane than the ego vehicle.

Known methods and systems for estimating the road lane geometry use cameras and radar to detect road markings and infer the road lane geometry from the detected road markings. However, the range of road markings that can be covered by cameras is typically limited to at most 100 m, which may be too short for many semi-autonomous and autonomous driving requirements. On the other hand, radar can only detect elevated road markings such as curb stones, guide posts or guardrails but not lane markings. Hence, radar can detect the geometry of the entire road ahead, but not of the individual lanes.

SUMMARY

Aspects of the embodiments of the present application provide an improved method and system for estimating road lane geometry, and in particular a method and a system for estimating road lane geometry that covers an extended range.

Aspects of the embodiments of the present application are provided by the subject-matters of the independent claims, wherein further aspects of the embodiments are incorporated in the dependent claims.

According to an aspect of an embodiment of the present application, there is provided a method for estimating road lane geometry including to estimate the geometry of the road lanes ahead of an ego vehicle. In this context, geometry refers to the two-dimensional representation of the road lanes, particularly their path.

According to the method, a camera lane estimation is provided. Said camera lane estimation is based on camera detection of road markings. In this context, "camera" refers to one or more cameras of the ego vehicle, wherein the cameras may operate in the visible and/or near infrared spectrum, i.e., with light of wavelengths between 380 nm and 750 nm or 750 nm and 3 μm, respectively. The camera lane estimation comprises at least one camera-estimated lane segment.

Further, a leading vehicle lane estimation is provided. Said leading vehicle lane estimation is based on traces of at least one leading vehicle, i.e., of at least one vehicle that is ahead of the ego vehicle. The assumption of the leading vehicle lane estimation is that most of the other vehicles, in particular the vehicles that are ahead of the ego vehicle, move on road lanes such that the traces of the leading vehicles are indicative of the road lanes. The leading vehicle lane estimation comprises at least one leading-vehicle-estimated lane segment.

According to the method, the at least one camera-estimated lane segment and the at least one leading-vehicle-estimated lane segment are stitched to obtain the estimated road lane geometry. Hence, the range of the road lane geometry given by the camera lane estimation is extended by the road lane geometry given by the leading vehicle lane estimation. Said road lane geometry with an extended range is beneficial as input for semi-autonomous driving and autonomous driving.

According to an embodiment, the at least one camera-estimated lane segment and the at least one leading-vehicle-estimated lane segment are each given by their left edge and their right edge. In this context, left edge and right edge refer to the edges of the lane segments in a driving direction of vehicles on the lane. In case that several lanes are arranged next to one another, the left edge of one lane may coincide with the right edge of an adjacent lane. The left edges and rights edges are given, in particular, as a list of two-dimensional points. Said two-dimensional points may be given in a coordinate system that is attached to the ego vehicle, wherein the y-direction may correspond to the driving direction of the ego vehicle and the x-direction to a direction perpendicular to the driving direction. The list of two-dimensional points may be ordered, such that the first two-dimensional point in the list is the one closest to the ego vehicle and the last two-dimensional point in the list is the one furthest from the ego vehicle. By connecting the two-dimensional points in the list, the edge of the lane is obtained.

According to an embodiment, the at least one camera-estimated lane segment is obtained by image recognition of road markings on images provided by at least one camera. Said at least one camera may be a visible light or near infrared camera. The road markings may be lane markings, curb stones, guide posts and/or guardrails. Said road markings are recognized by image recognition, wherein the image recognition may be based on artificial intelligence, e.g., a neural network or a decision tree.

According to an embodiment, the at least one leading-vehicle-estimated lane segment is obtained by tracking at least one leading vehicle. Tracking said leading vehicle may be performed by camera, lidar and/or radar. The output from the camera, lidar and/or radar may then be analyzed by artificial intelligence, in particular to obtain location information, e.g., two-dimensional points, of the at least one leading vehicle. Also, tracking the at least one leading vehicle may be performed by artificial intelligence based on the camera, lidar and/or radar output. The temporal location information of said at least one leading vehicle is then stored to obtain a trace of the at least one leading vehicle. In other words, a time series of locations of the at least one leading vehicle may be obtained. Said time series may be an ordered list of locations. If the locations are recorded in a coordinate that is attached to the ego vehicle, the fact that said coordinate system has moved along has to be account for in the computation of the trace of the at least one leading vehicle. The at least one leading-vehicle-estimated lane segment is then created at lane width around the trace of the at least one leading vehicle. If the at least one leading vehicle is in the center of a lane, the resulting leading-vehicle-estimated lane segment corresponds to a lane segment of the actual road. That is, for each location of each of the at least one leading vehicle, two-dimensional points corresponding to the left edge and the right edge of the at least one leading vehicle may be created at a distance of one-half of the lane width from the location of the at least one leading vehicle in either direction perpendicular to the moving direction of the at least one leading vehicle. The lane width may have a predetermined value or may be inferred from the lane width of the camera-estimated lane segments. Tracking of the at least one leading vehicle may be performed up to a distance of at least 150 m, preferably 200 m, more preferably 300 m, from the ego vehicle. The time series of locations may comprise locations of the at least one leading vehicle for at least 2 seconds, preferably at least 3 seconds, more preferably at least 5 seconds.

According to an embodiment, the at least one camera-estimated lane segment and/or the at least one leading-vehicle-estimated lane segment is smoothened. This may be performed by making a polynomial, in particular third degree polynomial, fit to the list of two-dimensional points and then sampling the fitted data back to a list of two-dimensional points. Said smoothening removes random errors in the lane segments and improves further processing. For the leading-vehicle-estimated lane segment, the smoothing may instead be performed on the trace of the at least one leading vehicle that is used to determined the leading-vehicle-estimated lane segments.

According to an embodiment, the at least one camera-estimated lane segment and/or the at least one leading-vehicle-estimated lane segment are extrapolated. Said extrapolation may be based on the whole lane segment, on the curvature of the lane segment at the end of the lane segment where the extrapolation is performed, or on the whole lane segment with higher weights assigned to points at the end of the lane segment where the extrapolation is performed and lower weights assigned to points at the end of the lane segment opposite to the extrapolation. Also, further smoothening may be performed on the lane segments, e.g., with a Kalman smoother. The extrapolation may be performed up to the location where adjacent lane segments reach one another and/or such that adjacent lane segments overlap. Here, adjacent lane segments refer to lane segments adjacent in the driving direction.

According to an embodiment the adjacent lane segments are stitched together if the overlap of the adjacent lane segments in a direction perpendicular to a driving direction of the lane is greater than 50%, preferably greater than 65%, more preferably greater than 80%. Hence, the stitching is performed only if there is significant overlap between the adjacent lane segments. If there is less overlap, it may be assumed that the lane segments do not belong to the same lane. This may, for example, occur if the leading vehicle changes lanes and hence the leading-vehicle-estimated lane segment does not correspond to an actual lane of the road.

According to an embodiment, a stitching quality measure is assigned to each of the stitches of the adjacent lane segments. Said stitching quality measure may be based on the overlap of the adjacent lane segments in a direction perpendicular to the driving direction of the lane. The stitching quality measure may then be used to describe an uncertainty of the estimated road lane geometry, e.g., for use in a Kalman filter.

According to an embodiment, an extra road lane is added if the overlap of a leading-vehicle-estimated lane segment with other lane segments in a direction perpendicular to the driving direction of the lane is less than 15%, preferably less than 5%, more preferably 0%. In other words, since there is little or no overlap with other lane segments, said leading-vehicle-estimated lane segment lies outside of the known lanes and is added as an extra lane. In particular, such an extra lane may correspond on an exit lane, a turning lane or an extra lane due to a widening of the road.

According to an embodiment, the method further comprises providing a road boundary estimation based on radar detection of road boundaries. Said road boundaries may be curb stones, guide posts and/or guardrails, are detected by a radar system of the ego vehicle and may be analyzed by an artificial intelligence. Smoothening, e.g., by fitting and re-sampling, as explained above, may be applied to the road boundary estimation. Leading-vehicle-estimated lane segments that lie more than 25%, preferably more than 15%, more preferably more than 5% outside the estimated road boundary are rejected and not further used, e.g., not stitched to other lane segments. Additionally or alternatively, the road boundary estimation may be used as an envelope for the at least one camera-estimated lane segment and/or at least one leading-vehicle-estimated lane segment.

According to an embodiment, the method further comprises broadcasting the estimated road lane geometry. Said broadcasting may be performed via a wired or a wireless connection. The broadcasting may also refer to copying the estimated road lane geometry to a different process within the same computing device or even to sharing the estimated road lane geometry in a memory that can also be accessed by a different process in the same computing device. The estimated road lane geometry is, in particular, broadcast to an advanced driver assistance system. Said advanced driver assistance system may be or may include, e.g., an automatic cruise control and/or an emergency brake assistant. The advanced driver assistance system may also be a system for semi-autonomous or autonomic driving. The advanced driver assistance system greatly benefits from the extended range of the estimated road lane geometry.

According to an aspect of an embodiment of the present application, there is provided a system for estimating road lane geometry. The system comprises at least one camera and a computing unit. The at least one camera may be a visible light and/or near infrared camera. The computing unit is configured to generate a camera lane estimation based on images of road markings taken by the camera and to generate a leading vehicle lane estimation based on traces of leading vehicles. The computing unit is further configured to stitch lane segments of the camera lane estimation and the leading vehicle lane estimation. The resulting estimated road lane geometry provides an extended range compared to a camera lane estimation based on images of road markings, which is beneficial, e.g., for advanced driver assistance systems.

The system may be, in particular, adapted to perform the method for estimating road lane geometry according to the above description.

According to an aspect of an embodiment of the present application, there is provided a vehicle comprising a system for estimating road lane geometry. Said vehicle may, in particular, further comprise an advanced driver assistance system that benefits from the extended range of the estimated road lane geometry provided by the system for estimating road lane geometry.

BRIEF DESCRIPTION OF THE DRAWINGS

The above and other aspects of the present application will be apparent from and elucidated further with reference to the embodiments described by way of examples in the following description and with reference to the accompanying drawings, in which.

Figure 1:
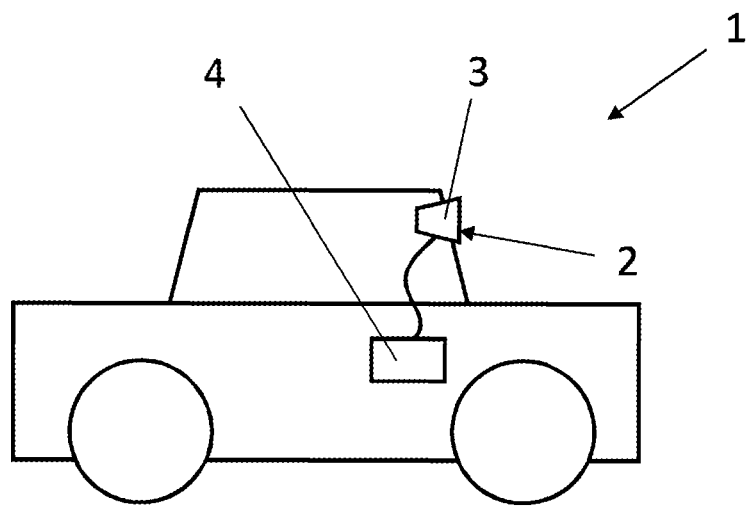
FIG. 1 shows an embodiment of a vehicle with a system for estimating road lane geometry.

It should be noted that the figures are purely diagrammatic and not drawn to scale. In the figures, elements which correspond to elements already described may have the same reference numerals. Examples, embodiments or optional features, whether indicated as non-limiting or not, are not to be understood as limiting the present application as claimed.

DETAILED DESCRIPTION OF THE EMBODIMENTS

FIG. 1 shows an embodiment of a vehicle 1 with a system 2 for estimating road lane geometry. The system 2 comprises a camera 3 and a computing unit 4, wherein the camera 3 is connected to the computing unit 4. In this embodiment, the connection of the camera 3 to the computing unit 4 is a wired connection, but also a wireless connection is possible.

The camera 3 is configured to take images of the area ahead of the vehicle 1, in particular of road markings and of leading vehicles. Said images are transferred to the computing unit 4 and analyzed by the computing unit 4. Said analysis may be performed by artificial intelligence, e.g., a neural network or a decision tree. As a result of the analysis, road markings and leading vehicles are identified and their locations are determined, e.g., as two-dimensional points.

Based on the identified road markings, a camera lane estimation is generated, comprising at least one camera-estimated lane segment. Based on traces of leading vehicles, a vehicle lane estimation is generated, comprising at least one leading-vehicle-estimated lane segment. Finally, the at least one camera-estimated lane segment and the at least one leading-vehicle-estimated lane segment are stitched by the computing unit 4. As a result, an estimated road lane geometry with a range greater than that of the camera lane estimation is obtained. Said estimated road lane geometry may be used by an advanced driver assistance system of the vehicle 1, benefitting greatly from the extended range.

Figure 2:
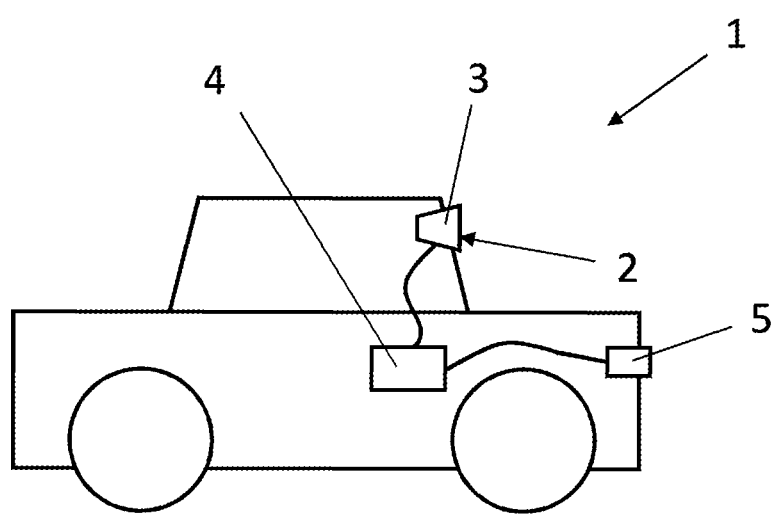
FIG. 2 shows another embodiment of a vehicle with a system for estimating road lane geometry.

FIG. 2 shows another embodiment of a vehicle 1 with a system 2 for estimating road lane geometry. This system also comprises a radar 5, connected to the computing unit 4. Using the radar, further detections of road boundaries and leading vehicles are performed. These detections may be used to improve the results of the road markings and leading vehicles detected by the camera 3 and to detect additional road boundaries. Said detected road boundaries are used by the computing unit 4 to generate a road boundary estimation which may be used to improve the generation of the estimated road lane geometry.

Figure 3A:
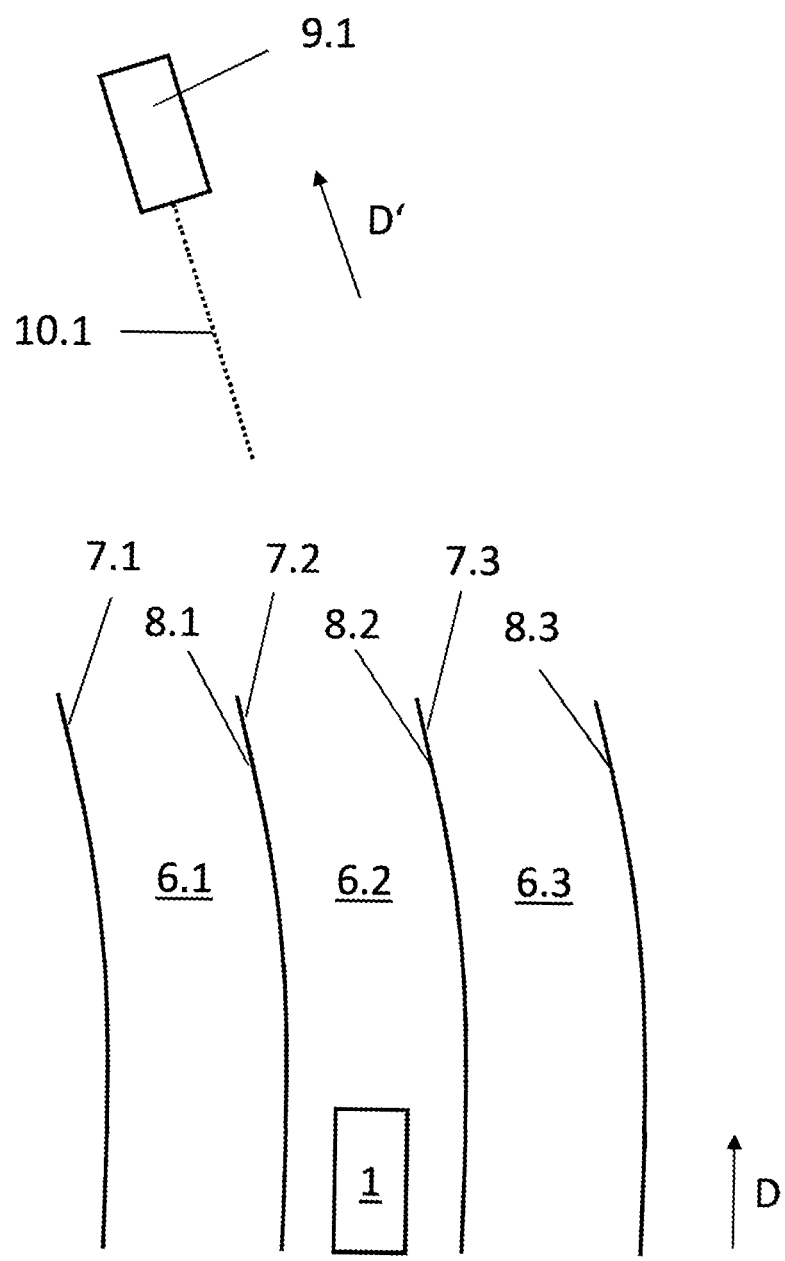
FIGS. 3a-3d show an example of a method for estimating road lane geometry.
Figure 3B:
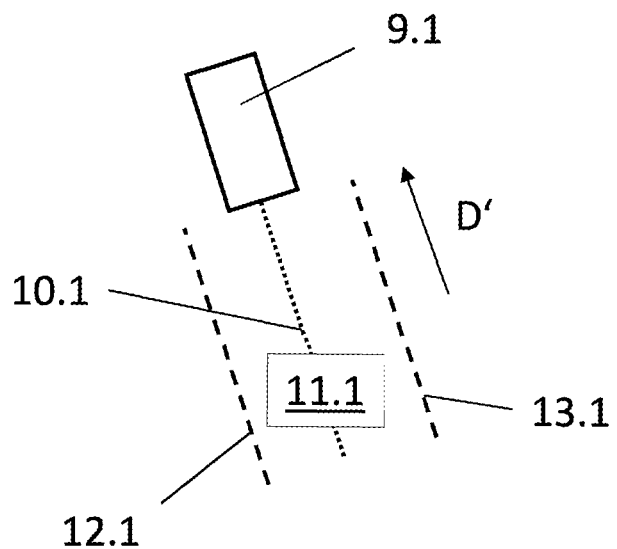
Figure 3B:
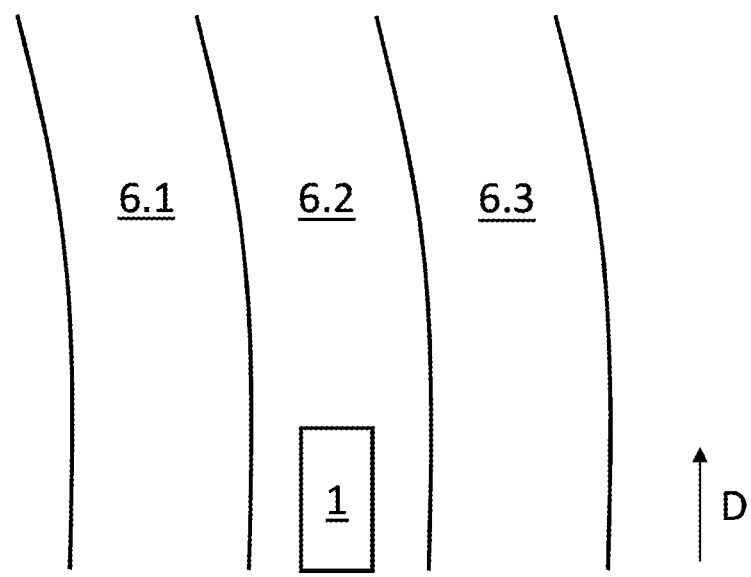

FIGS. 3a to 3d show an example of a method for estimating road lane geometry. In FIG. 3a, the ego vehicle 1 is shown as well as three camera-estimated lane segments 6.1 to 6.3. Said camera-estimated lane segments 6 have been obtained from road markings, such as lane markings, curb stones, guide posts and/or guardrails detected on images taken by the camera 3. The lane segments 6 are each given by their left edges 7.1 to 7.3, respectively and their right edges 8.1 to 8.3, respectively, wherein the left edge 7.2 coincides with the right edge 8.1 and the left edge 7.3 coincides with the right edge 8.2. Also shown is the driving direction D of the ego vehicle 1.

Further, a leading vehicle 9.1 is shown along with a trace 10.1 of the leading vehicle 9.1. Said trace 10.1 has been obtained by tracking the leading vehicle 9.1 using the camera 3 and/or radar 5 and storing temporal location information of the leading vehicle 9.1. Also, the driving direction D' of the leading vehicle 9.1 is shown.

As a next step, a leading-vehicle-estimated lane segment 11.1 is generated from the trace 10.1 of the leading vehicle 9.1. The leading-vehicle-estimated lane segment 11.1 is also given by is left edge 12.1 and right edge 13.1. The leading-vehicle-estimated lane segment 11.1 is generated by creating the left edge 12.1 and the right edge 13.1 at a distance of one-half of the lane width from the trace 10.1 to either direction perpendicular to the driving direction D' of the leading vehicle 9.1.

Figure 3C:
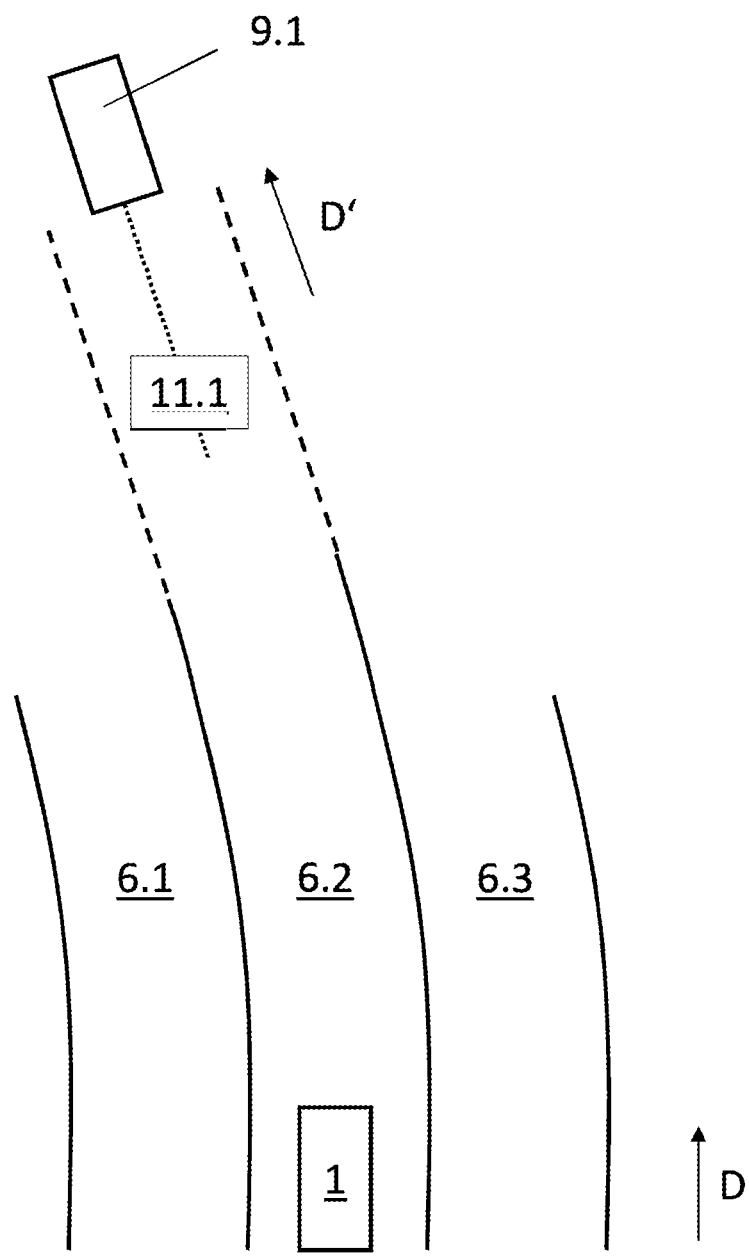

Then, the camera-estimated lane segments 6 and the leading-vehicle-estimated lane segment 11.1 are extrapolated until they reach one another, as shown in FIG. 3c. In this example, there is a perfect match of the extrapolated leading-vehicle-estimated lane segment 11.1 and the camera-estimated lane segment 6.2, i.e., the overlap of the leading-vehicle-estimated lane segment 11.1 and the camera-estimated lane segment 6.2 in a direction perpendicular to the driving direction D, D' is 100%.

Figure 3D:
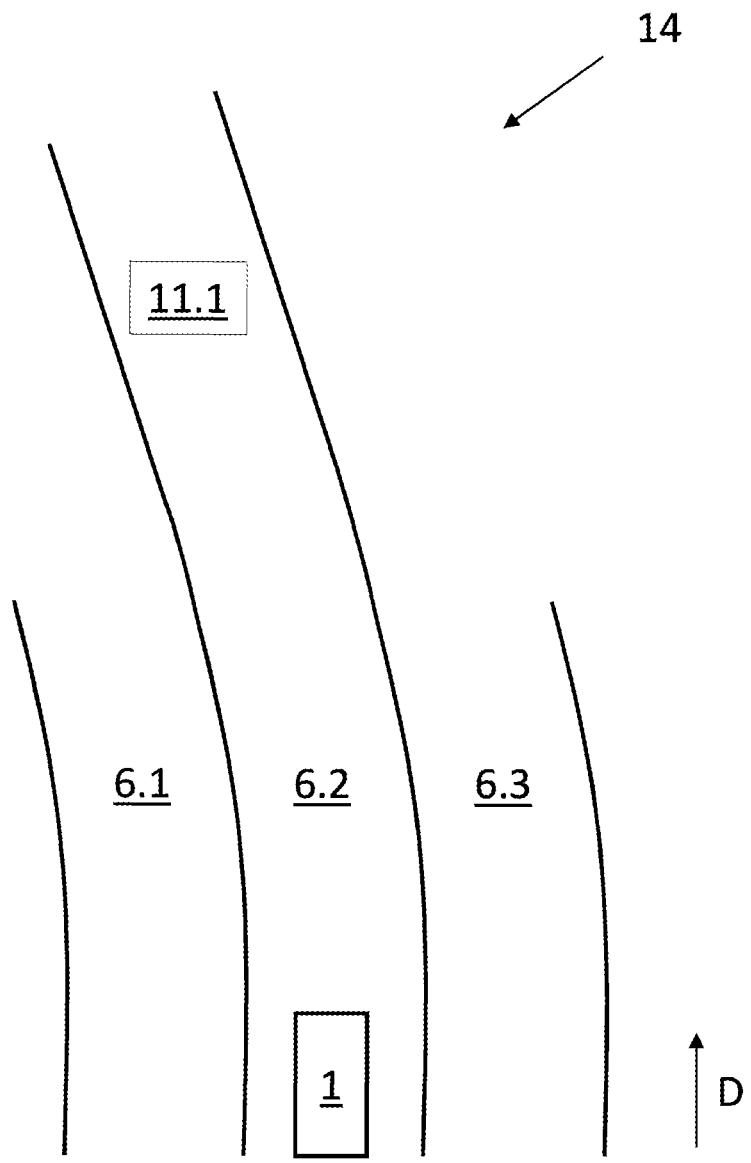

Hence, the camera-estimated lane segment 6.2 and the leading-vehicle-estimated lane segment 11.1 are stitched together to obtain the estimated road lane geometry 14 as shown in FIG. 3d.

Figure 4:
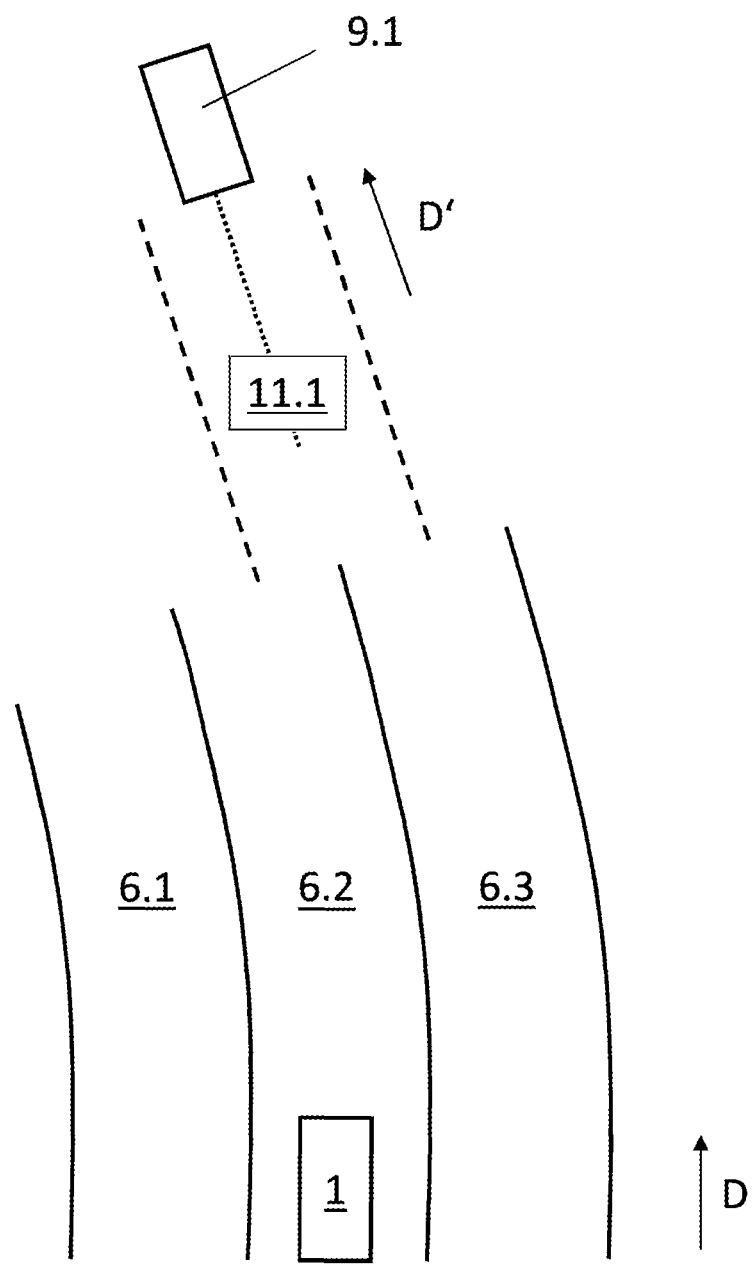
FIG. 4 shows another example of a method for estimating road lane geometry.

Shown in FIG. 4 is an example where the overlap of the leading-vehicle-estimated lane segment 11.1 and the camera-estimated lane segments 6.2 and 6.3 in a direction perpendicular to the driving direction D, D' are each about 50%. This may be the result, e.g., of the leading vehicle 9.1 changing lanes. In this case, the leading-vehicle-estimated lane segment 11.1 will not be stitched either the camera-estimated lane segment 6.2 or the camera-estimated lane segment 6.3 but will be discarded instead.

Figure 5A:
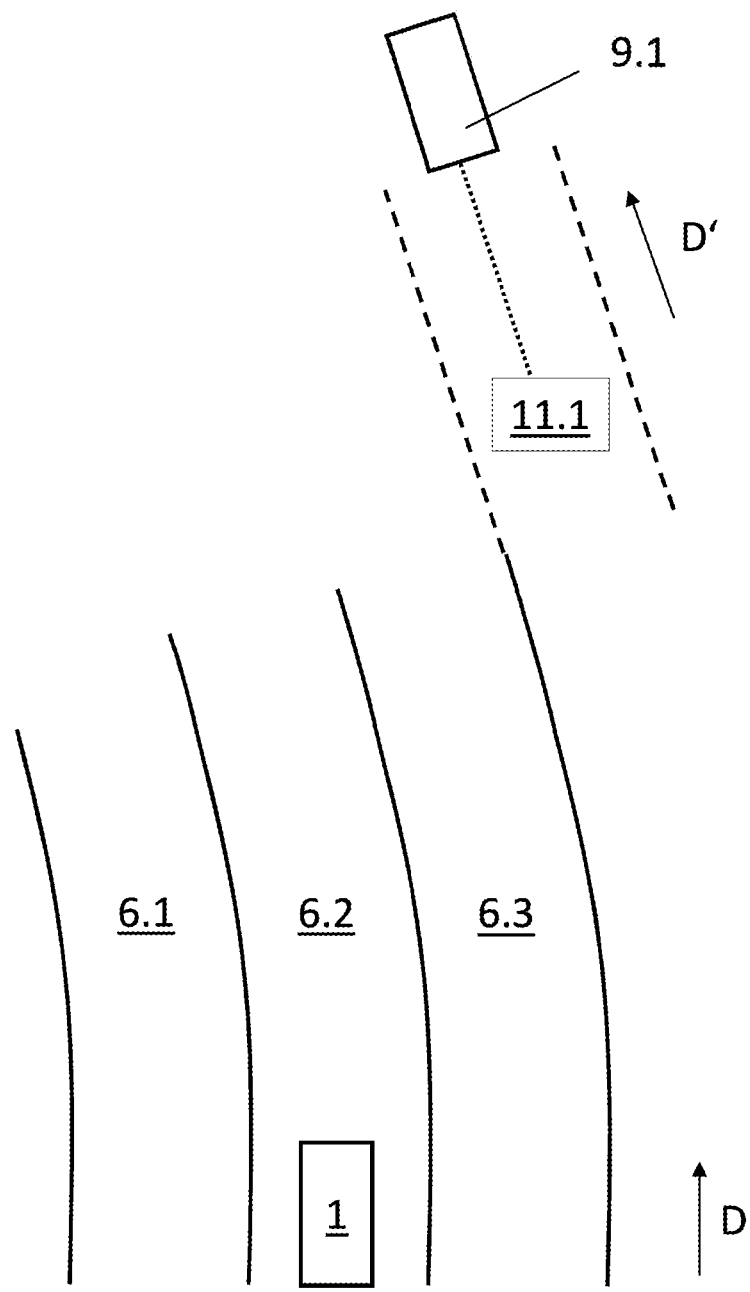
FIGS. 5a-5b show yet another example of a method for estimating road lane geometry.
Figure 5B:
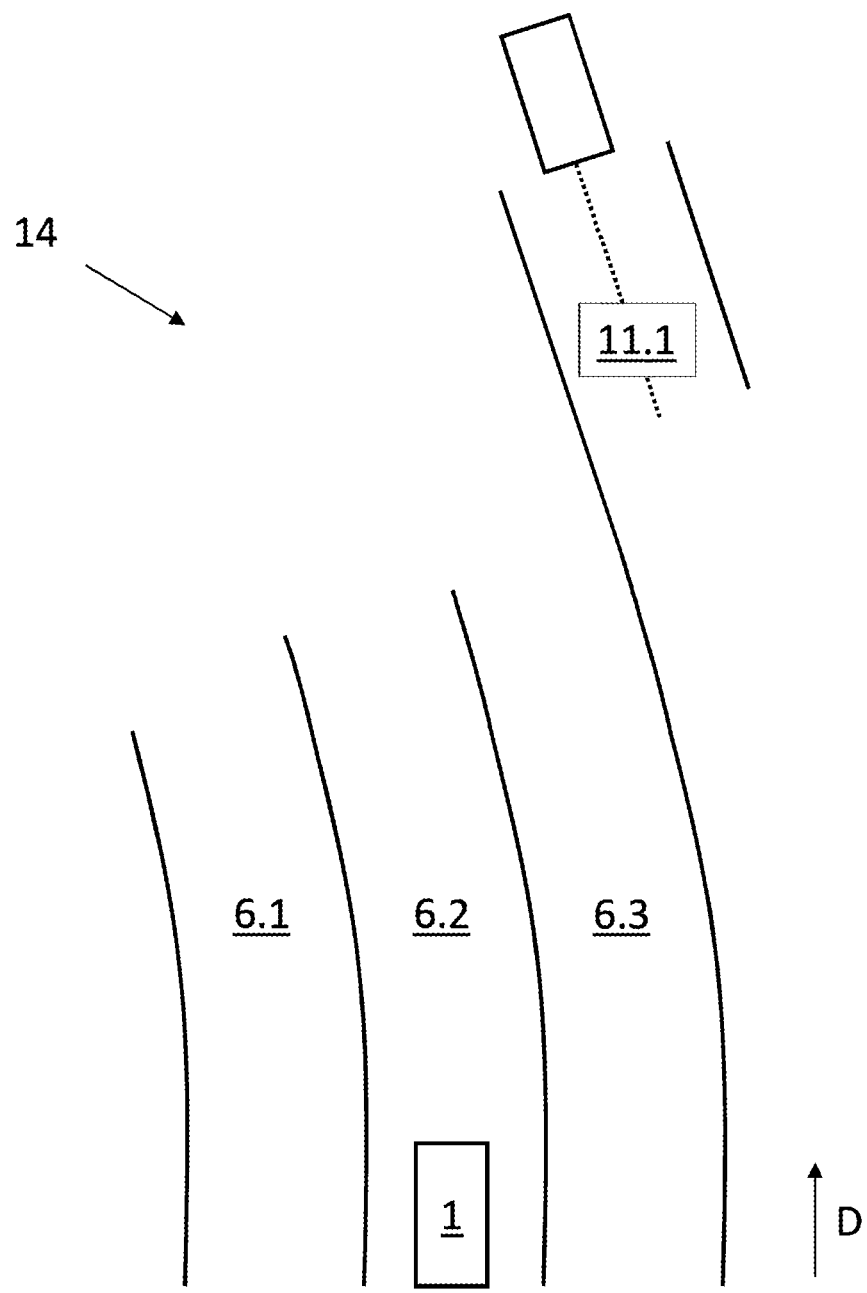

Shown in FIGS. 5a and 5b is an example where there is no overlap between the leading-vehicle-estimated lane segment 11.1 and any of the camera-estimated lane segments 6. This may indicate, e.g., an exit lane or a turning lane. Hence, an extra road lane corresponding to the leading-vehicle-estimated lane segment 11.1 is added and included in the road lane geometry 14. The start of the extra road lane has been set to the point of the trace 10.1 closest to the ego vehicle 1, since this is the first confirmed location where the extra road lane exists.

Figure 6A:
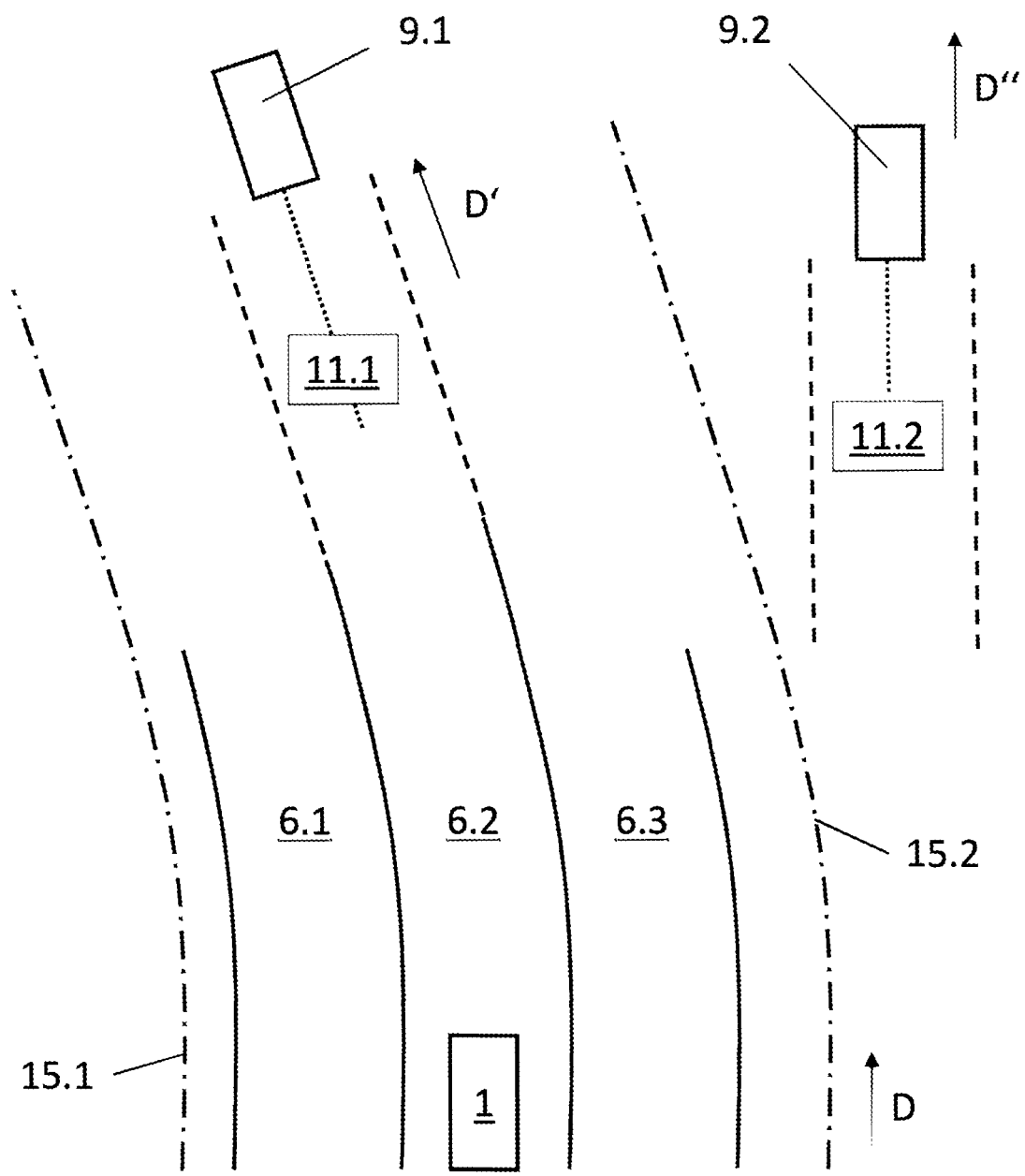
FIGS. 6a-6b show yet another example of a method for estimating road lane geometry.
Figure 6B:
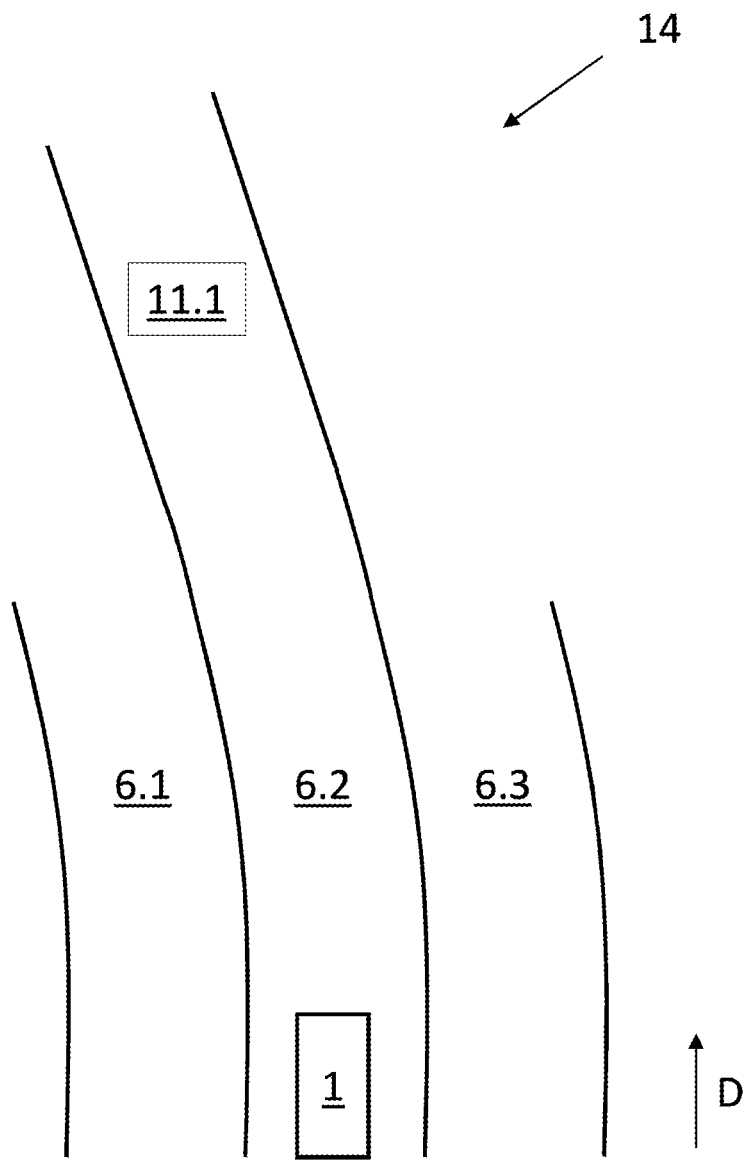

Shown in FIGS. 6a and 6b is an example where a left and right road boundary 15.1 and 15.2 has been obtained by a radar detection of road boundaries such as curb stones, guide posts and guardrails. Leading-vehicle-estimated lane segments 11.2 such as the one associated with leading vehicle 9.2 that lie more than a predetermined fraction outside the estimated road boundary 15 are also rejected and not used to generate the road lane geometry 14, shown in FIG. 6b.

Other variations to the disclosed embodiments can be understood and effected by those skilled in the art in practicing the aspects of the embodiments of the present application, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A method for estimating road lane geometry of a lane of a road on which a vehicle travels, the method comprising:
   detecting a camera-estimated lane segment of the lane of the road based on road markings of the lane of the road in images obtained from a camera;
   detecting a leading-vehicle-estimated lane segment of a lane of the road based on a trace of a leading vehicle traveling on the road in front of the vehicle;
   extrapolating the camera-estimated lane segment or the leading-vehicle-estimated lane segment until the camera-estimated lane segment or the leading-vehicle-estimated lane segment overlaps with an adjacent lane segment; and
   determining the road lane geometry of the lane of the road based on the extrapolated at least one of the camera-estimated lane segment or the leading-vehicle-estimated lane segment overlapping with the adjacent lane segment.

2. The method according to claim 1, wherein detecting the camera-estimated lane segment and the leading-vehicle-estimated lane segment comprises detecting a left edge of the lane of the road and detecting a right edge of the lane of the road as a list of two-dimensional points.

3. The method according to claim 1, wherein detecting the camera-estimated lane segment comprises performing image recognition of the road markings based on the images obtained by the camera, and
   wherein the road markings comprise at least one of lane markings, curb stones, guide posts and guardrails.

4. The method according to claim 1, wherein detecting the leading-vehicle-estimated lane segment comprises tracking the leading vehicle, storing temporal location information of the leading vehicle to obtain the trace of the leading vehicle, and determining a lane width of the lane of the road based on the trace.

5. The method according to claim 2, further comprising:
   smoothing data of the camera-estimated lane segment and the leading-vehicle-estimated lane segment by fitting a polynomial to the list of two-dimensional points; and
   sampling the data of the camera-estimated lane segment and the leading-vehicle-estimated lane segment fit to the polynomial as the list of two-dimensional points.

6. The method according to claim 5, wherein the determining comprises combining adjacent lane segments are stitched together if the overlap of the camera-estimated lane segment or the leading-vehicle-estimated lane segment with the adjacent lane segment in a direction perpendicular to a driving direction of the lane is greater than 50%.

7. The method according to claim 6, further comprising assigning a stitching quality measure to each of the adjacent lane segments based on the overlap of the camera-estimated lane segment or the leading-vehicle-estimated lane segment with the adjacent lane segment in the direction perpendicular to the driving direction of the lane.

8. The method according to claim 7, further comprising determining an extra road lane of the road if the overlap of the leading-vehicle-estimated lane segment with another lane segment in the direction perpendicular to the driving direction of the lane is less than 15%.

9. The method according to claim 8, further comprising:
   providing a road boundary estimation of a road boundary of the road based on radar detection of road boundaries of the road; and
   rejecting leading-vehicle-estimated lane segments that lie more than 25% outside the road boundary.

10. The method according to claim 9, further comprising broadcasting the road lane geometry to an advanced driver assistance system.

11. A system for estimating road lane geometry of the lane of the road on which a vehicle travels, the system comprising:
    at least one camera; and
    a computing unit configured to detect a camera-estimated lane segment of the lane of the road based on road markings of the lane of the road in images obtained from a camera, detect a leading-vehicle-estimated lane segment of a lane of the road based on a trace of a leading vehicle traveling on the road in front of the vehicle, extrapolate the camera-estimated lane segment or the leading-vehicle-estimated lane segment until the camera-estimated lane segment or the leading-vehicle-estimated lane segment overlaps with an adjacent lane segment, and determine the road lane geometry of the lane of the road based on the extrapolated at least one of the camera-estimated lane segment or the leading-vehicle-estimated lane segment overlapping with the adjacent lane segment.

* * * * *